US010326488B2

(12) United States Patent
Wojcik

(10) Patent No.: US 10,326,488 B2
(45) Date of Patent: Jun. 18, 2019

(54) ELECTRONIC DEVICE CASE WITH INDUCTIVE COUPLING FEATURES

(71) Applicant: Otter Products, LLC, Fort Collins, CO (US)

(72) Inventor: James J. Wojcik, Kirkland, WA (US)

(73) Assignee: Otter Products, LLC, Fort Collins, CO (US)

( * ) Notice: Subject to any disclaimer, the term of this patent is extended or adjusted under 35 U.S.C. 154(b) by 174 days.

(21) Appl. No.: 15/017,894

(22) Filed: Feb. 8, 2016

(65) Prior Publication Data

US 2016/0294427 A1     Oct. 6, 2016

Related U.S. Application Data

(60) Provisional application No. 62/141,807, filed on Apr. 1, 2015.

(51) Int. Cl.
*H04B 1/3883* (2015.01)
*H04B 5/00* (2006.01)
*H04B 1/3888* (2015.01)

(52) U.S. Cl.
CPC ......... *H04B 1/3883* (2013.01); *H04B 1/3888* (2013.01); *H04B 5/0037* (2013.01); *H04B 5/0081* (2013.01)

(58) Field of Classification Search
CPC ... H04B 1/3883; H04B 5/0037; H04B 1/3888
(Continued)

(56) References Cited

U.S. PATENT DOCUMENTS 6,249,256 B1   6/2001  Luxon et al.
7,728,551 B2   6/2010  Reed et al.
(Continued)

FOREIGN PATENT DOCUMENTS

CN   103171477 A    6/2013
WO   2012176206 A2  12/2012
WO   2013080068 A1  6/2013

OTHER PUBLICATIONS

Branscombe, "The future of Wireless Power: 2. Taking Wireless Power Further", Tom's Guide, Mar. 28, 2011, <http://www.tomsguide.com/us/Wireless-Power-Tesla-Fulton-eCoupled,review-1641-2.html>, last accessed Jun. 11, 2015.
(Continued)

*Primary Examiner* — April G Gonzales

(57) ABSTRACT

A protective case includes a shell for receiving and at least partially covering an electronic device. The shell includes a first material and has a back portion and side portions extending from the back portion. The back portion is configured to be adjacent to the back surface of the electronic device when the electronic device is installed. The case also includes a core comprising a second material having a magnetic permeability substantially greater than a magnetic permeability of the first material. The core is affixed to the back portion of the shell at a location that coincides with a center region of the wireless charging coil of the wireless charging circuitry of the installed electronic device. The core increases magnetic coupling between the wireless charging coil of the installed electronic device and a source charging coil when the protective case is placed in proximity to the source charging coil.

21 Claims, 6 Drawing Sheets

(58) Field of Classification Search
USPC .............................................. 455/573, 575.8
See application file for complete search history.

(56) References Cited

U.S. PATENT DOCUMENTS

| | | | |
|---|---|---|---|
| 7,868,585 B2 | 1/2011 | Samowsky et al. | |
| 7,876,272 B2 | 1/2011 | Dou et al. | |
| 7,889,498 B2 | 2/2011 | Diebel et al. | |
| 8,208,980 B2 | 6/2012 | Wong et al. | |
| 8,214,003 B2 | 7/2012 | Wong et al. | |
| 8,310,200 B2 | 11/2012 | Matouka et al. | |
| 8,442,602 B2 | 5/2013 | Wong et al. | |
| 8,541,974 B2 | 9/2013 | Farahani | |
| 8,750,948 B2 | 6/2014 | Wong et al. | |
| 8,907,752 B2 | 12/2014 | Wodrich et al. | |
| 9,026,187 B2 | 5/2015 | Huang | |
| 9,153,109 B1* | 10/2015 | Foster | G08B 13/14 |
| 9,698,632 B2 | 7/2017 | Davison et al. | |
| 9,774,192 B2* | 9/2017 | Wojcik | H05K 5/0086 |
| 10,008,870 B2* | 6/2018 | Davison | H02J 7/0054 |
| 2003/0045246 A1 | 3/2003 | Lee et al. | |
| 2005/0188203 A1* | 8/2005 | Bhaskaran | G06F 21/125 |
| | | | 713/176 |
| 2006/0022889 A1 | 2/2006 | Chiang et al. | |
| 2006/0261777 A1* | 11/2006 | Li | H02J 7/355 |
| | | | 320/101 |
| 2007/0052600 A1* | 3/2007 | Kamitani | G06K 7/0008 |
| | | | 343/702 |
| 2008/0164855 A1* | 7/2008 | Tam | G06F 1/263 |
| | | | 323/233 |
| 2008/0315826 A1* | 12/2008 | Alberth, Jr. | H02J 7/0013 |
| | | | 320/101 |
| 2009/0051223 A1* | 2/2009 | Woo | H02J 7/0013 |
| | | | 307/80 |
| 2009/0066529 A1* | 3/2009 | Fukada | G01R 31/371 |
| | | | 340/657 |
| 2009/0106567 A1 | 4/2009 | Baarman | |
| 2009/0322158 A1 | 12/2009 | Stevens et al. | |
| 2010/0003950 A1* | 1/2010 | Ray | G10L 13/043 |
| | | | 455/404.1 |
| 2010/0156344 A1 | 6/2010 | Inoue et al. | |
| 2010/0171234 A1* | 7/2010 | Lee | B29C 48/04 |
| | | | 264/129 |
| 2010/0270970 A1 | 10/2010 | Toya et al. | |
| 2010/0317413 A1* | 12/2010 | Tan | H02J 7/0044 |
| | | | 455/573 |
| 2010/0323616 A1 | 12/2010 | Novak et al. | |
| 2011/0050164 A1 | 3/2011 | Partovi et al. | |
| 2011/0163714 A1 | 7/2011 | Ettes et al. | |
| 2011/0260681 A1 | 10/2011 | Guccione et al. | |
| 2012/0019057 A9 | 1/2012 | Kirby et al. | |
| 2012/0088558 A1* | 4/2012 | Song | H04M 1/18 |
| | | | 455/575.1 |
| 2012/0091950 A1 | 4/2012 | Campanella et al. | |
| 2012/0112691 A1 | 5/2012 | Kurs et al. | |
| 2012/0178505 A1 | 7/2012 | Yang et al. | |
| 2012/0235792 A1* | 9/2012 | Huang | G06K 7/10386 |
| | | | 340/10.1 |
| 2012/0303520 A1* | 11/2012 | Huang | H01M 10/46 |
| | | | 705/39 |
| 2012/0316811 A1* | 12/2012 | Choi | G06F 1/3212 |
| | | | 702/63 |
| 2012/0319487 A1* | 12/2012 | Shah | H02J 7/0054 |
| | | | 307/66 |
| 2013/0038279 A1 | 2/2013 | Seyerle et al. | |
| 2013/0069583 A1* | 3/2013 | Lemelman | G06F 1/1635 |
| | | | 320/107 |
| 2013/0119922 A1 | 5/2013 | Chen et al. | |
| 2013/0206844 A1* | 8/2013 | Chen | H04B 1/3888 |
| | | | 235/492 |
| 2013/0214730 A1 | 8/2013 | Lu et al. | |
| 2013/0234481 A1 | 9/2013 | Johnson | |
| 2014/0065948 A1 | 3/2014 | Huang | |
| 2014/0091758 A1 | 4/2014 | Hidaka et al. | |
| 2014/0117921 A1* | 5/2014 | Suomela | H04B 5/0031 |
| | | | 320/103 |
| 2014/0191033 A1 | 7/2014 | Wojcik et al. | |
| 2014/0191724 A1 | 7/2014 | Wojcik et al. | |
| 2014/0210406 A1 | 7/2014 | Na et al. | |
| 2014/0217965 A1 | 8/2014 | Wiemeersch et al. | |
| 2014/0253024 A1 | 9/2014 | Rautiainen et al. | |
| 2014/0306654 A1 | 10/2014 | Partovi | |
| 2015/0111626 A1* | 4/2015 | Bell | G06F 1/1637 |
| | | | 455/575.8 |
| 2015/0236550 A1 | 8/2015 | Yang et al. | |
| 2015/0270734 A1 | 9/2015 | Davison et al. | |
| 2015/0364938 A1* | 12/2015 | Lapetina | H01F 27/365 |
| | | | 320/114 |
| 2016/0079793 A1 | 3/2016 | Cho et al. | |
| 2016/0173667 A1* | 6/2016 | Torres Gutierrez | H04M 1/04 |
| | | | 455/575.1 |
| 2016/0211702 A1 | 7/2016 | Muratov et al. | |
| 2016/0261133 A1* | 9/2016 | Wang | H02J 7/025 |
| 2016/0294427 A1 | 10/2016 | Wojcik | |

OTHER PUBLICATIONS

Capdase CA00-C201 "PowerCup 2.2" Car Cup Holder Charger, available Dec. 2012, <http://www.amazon.in/Capdase-CA00-C201-Car-Mount-Holder/dp/B004OC5K1E> last accessed Jun. 11, 2015.
Haselton, "GM to Add Gadget Wireless Charging Feature to Cars in 2014", TechnoBuffalo.com, Aug. 24, 2014, <http://www.technobuffalo.com/2013/08/24/gm-wireless-charging-cars/>, last accessed Jun. 11, 2015.
Kurs et al., "Wireless Power Transfer via Strongly Coupled Magnetic Resonances", Science, Jul. 6, 2007, pp. 83-86, vol. 317.
Kuyvenhoven et al., "Development of a Foreign Object Detection and Analysis Method for Wireless Power Systems", 2011 IEEE Symposium on Product Compliance Engineering (PSES) Oct. 10, 2011-Oct. 12, 2011, San Diego, CA., pp. 1-6.
Ogg, "Wireless Power Gets Recharged", CNET Wireless Power, Jan. 5, 2007, <http://news.cnet.com/Wireless-power-gets-recharged/2100-1041_3-6147684.html> last accessed Jun. 11, 2015.
Sengupta et al., "Universally Compatible Wireless Power Using the Qi Protocol", Low Power Design, 2011, pp. 1-6, <http://lowpowerdesign.com/article_TI-Qi.html> last accessed Apr. 11, 2014.

* cited by examiner

ELECTRONIC DEVICE CASE WITH INDUCTIVE COUPLING FEATURES

CROSS REFERENCE TO RELATED APPLICATIONS

This application claims the benefit of U.S. Provisional Patent Application No. 62/141,807, filed Apr. 1, 2015, which is hereby incorporated by reference in its entirety.

FIELD

This application relates to cases and covers for electronic devices and the manufacture thereof. More particularly, this application relates to electronic device cases and covers that enhance electromagnetic inductive interactions between the electronic devices and other devices.

BACKGROUND

Electronic devices are commonly used for communication and entertainment purposes. Electronic devices include devices such as smartphones, cellular phones, mobile communication devices, computers, portable computing devices, mobile computing devices, tablet computers, cameras, video players, smart watches, audio players, electronic media readers, two-way radios, global positioning satellite (GPS) devices, and/or other types of electronic computing or communication devices, including combinations thereof. Cases, protective cases, covers, protective covers, enclosures, or encasements are sometimes used with these types of electronic devices in order to protect the devices from damage due to exposure to shock, impact, dropping, puncture, dust, dirt, water, snow, rain, mud, chemicals, and/or other potentially damaging forces or elements. Cases are also sometimes used to supplement the functionality, features, or performance of an electronic device. Technology advancements have increased the number of electronic device functions which may be performed wirelessly.

SUMMARY

Cases and covers for an electronic device having wireless charging circuitry and a wireless charging coil are disclosed. One exemplary case includes a shell for receiving and at least partially covering an electronic device. The shell includes a first material and has a back portion and side portions extending from the back portion. The back portion of the shell is configured to be adjacent to the back surface of the electronic device when the electronic device is installed in the case. The case also includes a core comprising a second material that has a magnetic permeability that is substantially greater than a magnetic permeability of the first material. The core is affixed to the back portion of the shell at a location on the back portion that coincides with a center region of the wireless charging coil of the wireless charging circuitry of the installed electronic device. The core increases inductive magnetic coupling between the wireless charging coil of the installed electronic device and a source charging coil when the protective case with the installed electronic device is placed in proximity to the source charging coil.

Also disclosed are methods of manufacturing cases and covers for an electronic device having wireless charging circuitry that includes a wireless charging coil proximate a back surface of the electronic device. One exemplary method includes preparing a first molding material and preparing a second molding material that includes the first molding material and a material having a high magnetic permeability relative to the first molding material. The method further includes molding a shell from the first molding material and the second molding material. The shell is molded in a shape configured for receiving and at least partially covering the electronic device. The shell has a back portion and side portions extending from the back portion. The back portion of the shell is configured to be adjacent to the back surface of the electronic device when the electronic device is installed in the cover. A substantial portion of the shell is molded from the first molding material and a coupling region of the shell includes the second molding material. The coupling region is located on the back portion of the shell and aligns with a center region of the wireless charging coil of the wireless charging circuitry of the installed electronic device. The coupling region increases or improves magnetic inductive coupling between the wireless charging coil of the installed electronic device and a source charging coil that is external to the cover when the cover with the installed electronic device is placed in proximity to the source charging coil.

As described herein, many variations of the apparatuses, cases, covers, and methods of manufacture are possible. The term "case" is used herein to refer to any type of case, cover, protective case, protective cover, enclosure, encasement, shell, or combination thereof. While some of the examples herein are described with respect to "protective" cases, the techniques disclosed herein may be used with or implemented in cases that do not necessarily have protective features or characteristics.

BRIEF DESCRIPTION OF THE DRAWINGS

The disclosed techniques will be described and explained through the use of the accompanying figures in which.

DETAILED DESCRIPTION

Figure 1:
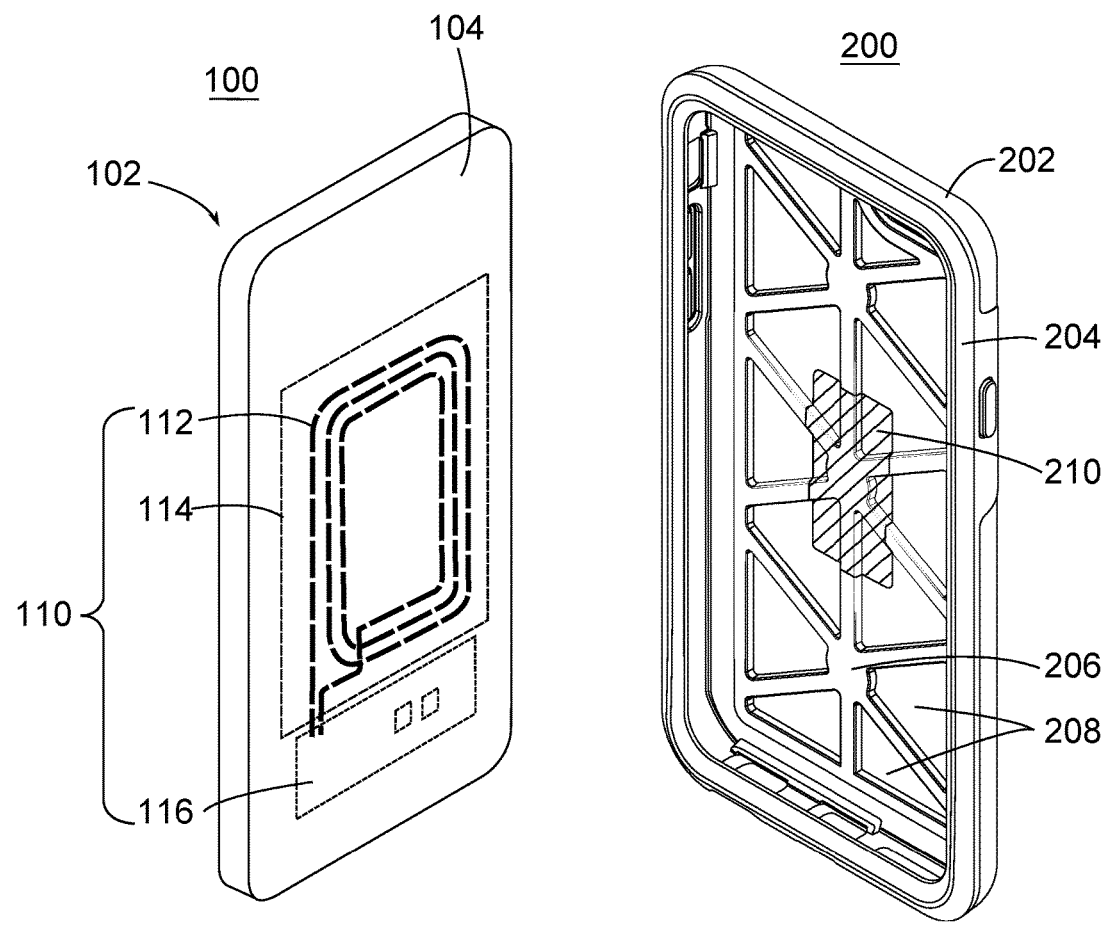
FIG. 1 illustrates a perspective view of an electronic device and protective case.

In the following detailed description, various specific details are set forth in order to provide an understanding of and describe the systems, apparatuses, methods, and techniques introduced here. However, the systems, apparatuses, methods, and techniques may be practiced without the specific details set forth in these examples. Various alternatives, modifications, and/or equivalents will be apparent to those skilled in the art without varying from the spirit of the introduced systems, apparatuses, and techniques. For example, while the examples described herein refer to particular features, the scope of these solutions also include techniques and implementations having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

As wireless communication and other wireless techniques becomes more prevalent, electronic devices increasingly include one or more antennae for features other than cellular telephony. The antennae may include one or more coils used for near field communications (NFC), wireless power transfer, and/or the like. In some situations, wireless transfer of electrical power is accomplished using electromagnetic induction techniques. Wireless power transfer circuitry and antennae may utilize one or standard or proprietary wireless power transfer protocols, such as those published and promoted by Qi, PMA (Power Matters Alliance), A4WP (Alliance for Wireless Power), and/or others. Conveniently, these systems and standards allow the batteries of electronic devices to be recharged without physically connecting a cable or plug to the electronic device.

Inductive power transfer occurs when an electric current is provided to a transmitting antenna/coil/inductor, which induces a changing magnetic field about the transmitting antenna/coil/inductor. This changing magnetic field induces a reverse effect in a receiving coil. That is, the magnetic field induces a current in the receiving coil. However, the magnetic field can also affect other electronic circuitry in the vicinity. Moreover, the magnetic field can be significantly or fatally attenuated by an underlying ground plane of the circuitry. A high magnetic permeability material, such as a ferrite (or another material having ferromagnetic properties), may thus be applied as a sheet backing to the antenna/coil in a wireless power transfer circuit to prevent effects of the magnetic field on other circuitry, and vice versa. That is, the material may constrain the magnetic field generated at the transmitting coil. For example, a sheet of ferrite material may be placed between a receiving antenna/coil and other circuitry in a smartphone to block or significantly reduce magnetic flux effects on the other circuitry. Similarly, a ferrite material may also be used as a core (e.g., in or near the center of) a power transmitting coil. This placement concentrates, and to a degree directs or steers the magnetic flux, increasing the magnetic coupling efficiency or the efficiency of the magnetic induction power transfer, between the transmitting and receiving coils.

In some circumstances, the effective distance for power transfer between a wireless power transmitter, or charging surface, and a receiving device may be relatively small. In other words, even though a cable or connector does not have to be attached, the devices often have to be close to each other. These limitations are primarily due to the physics of magnetic induction, current limits, and practical limits on coil sizes due to the sizes of the devices themselves. For example, the Qi protocol for power transfer limits power transfer distance to a few millimeters. When an electronic device is in a protective case, the thickness of the case often limits how closely the electronic device can be placed to a charging circuitry and/or a charging surface. The thickness of case material between the wireless power transfer antenna or coil and any wireless power transmitter can reduce the efficiency or even prevent the power transfer from taking place. In addition, the case material may cause a shielding or blocking effect and further limit the power transfer between the devices.

However, as electronic devices have become smaller and thinner, a backing or a core having high magnetic permeability may be omitted in the interest of reduced volume or size, despite the effects on signal or power transfer efficiency. In other words, a backing or core may be omitted if a desired level of performance can be achieved without it. Ferrite materials may also not be used in a power receiving antenna/coil, particularly as antennas/coils are made very thin. Some power receiving coils, for example are in the range of 0.1 mm in thickness and a ferrite core of this thickness may be insufficient to provide a sufficient benefit.

Electronic device manufacturers need not presume that additional high magnetic permeability materials are necessary, as the manufacturers may have a preferred wireless signal (e.g., power transfer) propagation scheme that works well enough for the manufacturer's target consumer. For example, the manufacturer may have a preferred power transmitting device that provides sufficient power transfer under normal circumstances. However, consumers cannot be relied upon to use only a device manufacturer's preferred configuration, instead using third party chargers, placing protective cases on their devices, not aligning the devices correctly, or otherwise deviating from the manufacturer's preferred configuration. The inventors have, for example, experimented with a particular smartphone having built-in wireless power transfer circuitry that will charge from the smartphone manufacturer's charger, but not from other manufacturer's chargers, in some instances. Similarly, when the smartphone is encased in a protective enclosure, the added thickness between the phone's built-in wireless charging circuitry and a charging device has been observed to reduce the efficiency of charging, or prevent charging altogether, when using a particular wireless charging protocol.

Accordingly, cases and covers are introduced here which, with little or no additional thickness compared with a standard case or cover, enhance the magnetic coupling between an external wireless charge transmitter (antenna/coil/inductor) and the wireless charge receiving circuitry (including a receiving antenna/coil/inductor) of a portable electronic device, such as a smartphone enclosed by the case. In some situations, the techniques disclosed herein may also be used with devices or systems which utilize other types or variations of wireless communication or power transfer, such as resonant inductive coupling.

FIG. 1 illustrates a perspective view of an electronic device 100 and a protective case 200. Electronic device 100 may be or may include any type of device from the categories of: smartphones, cellular phones, mobile communication devices, computers, portable computing devices, mobile computing devices, tablet computers, cameras, video players, smart watches, audio players, electronic media readers, two-way radios, global positioning satellite (GPS) devices, and/or other types of electronic computing or communication devices, including combinations thereof.

Electronic device 100 includes a wireless charging circuit 110 (shown in dotted lines representing elements that are present inside device on necessarily visible on the outside of the device). Wireless charging circuit 110 allows electronic device 100 to be charged and/or powered from an external device (not pictured) without having to attach a cable or other type of electromechanical connector between electronic device 100 and the external device. Wireless charging circuit 110 may include a receiving coil 112 having a ferrite backing 114, and a printed circuit board 116 inside a housing 102 of electronic device 100. The receiving coil 112 may be attached to the printed circuit board (PCB) 116 and/or other circuitry for conveying an electrical current to the circuitry for processing and/or charging a battery (not shown) of electronic device 100. The received electrical current may be induced by changes in a perceived magnetic field, e.g., from a transmitter external to the smartphone. When not in a case or cover, a rear surface 104 of the electronic device 100 may be placed directly against a surface of a wireless power charger or a wireless charging surface (not shown). In some implementations, rear surface 104 may include or conceal magnets or other structures for attaching/aligning the rear surface 104 to/with the wireless power charger.

Protective case 200 may include a structural shell portion 202 and a compliant shell portion 204. Structural shell portion 202 may provide some degree of stiffness or rigidity to protective case 200 and may also provide some resistance to abrasion. Protective case 200 may further include, but does not require, an internal cushion layer 206 which may provide a softer or more compliant surface against one or more surfaces of the electronic device 100 rests when electronic device 100 is inserted in protective case 200. Cushion layer 206 may have a lattice as shown or other pattern that provides cavities, such as cavities 208, between electronic device 100 and protective case 200 when electronic device 100 is installed in protective case 200. Protective case 200 may be made from any suitable material or suitable combination of materials.

It should be understood that the techniques and methods disclosed herein may be implemented in any type of case, cover, or encasement and are not limited to a protective case such as protective case 200. The techniques and methods may be implemented in a one-piece case, a comolded case, a two piece case, a case having more than two primary members, a case that partially covers the electronic device, a case that fully covers the electronic device, a water resistant case, a waterproof case, as well as other types of cases, covers, or encasements.

Because electronic device 100 typically fits into protective case 200 snugly, a portion of an interior surface of protective case 200 may correspond to the receiving coil 112 of the wireless charging circuitry 110 in electronic device 100 when electronic device 100 is installed in protective case 200. That portion of protective case 200 may include a high magnetic permeability material, such as ferrite 210, disposed to correspond to a center of the receiving coil 112. As described herein, ferrite 210 concentrates a magnetic flux from an external charging device to increase magnetic coupling to receiving coil 112 and, thus, efficiency of power transfer from the external charging device to receiving coil 112. The increased efficiency may be necessary to compensate for the increased space between receiving coil 112 and the external charging device due to protective case 200. In some configurations, ferrite 210 will be attached such that is has a primary plane that is substantially parallel to a primary plane of coil 112 when electronic device 100 is installed in protective case 200. In some configurations, an axis of ferrite 210 will be the same as or parallel to an axis of coil 112.

While many of the examples herein are discussed with respect to ferrite 210, it should be understood that any high magnetic permeability material, or combination of materials, may be used to form a core, a core region, an insert, a high magnetic permeability region, a coupler, and/or a coupling region in protective case 200 which provides some or all of the magnetic and/or inductive coupling benefits described herein. The apparatuses, improvements, methods, and techniques disclosed herein are not to be limited to ferrite.

Figure 2:
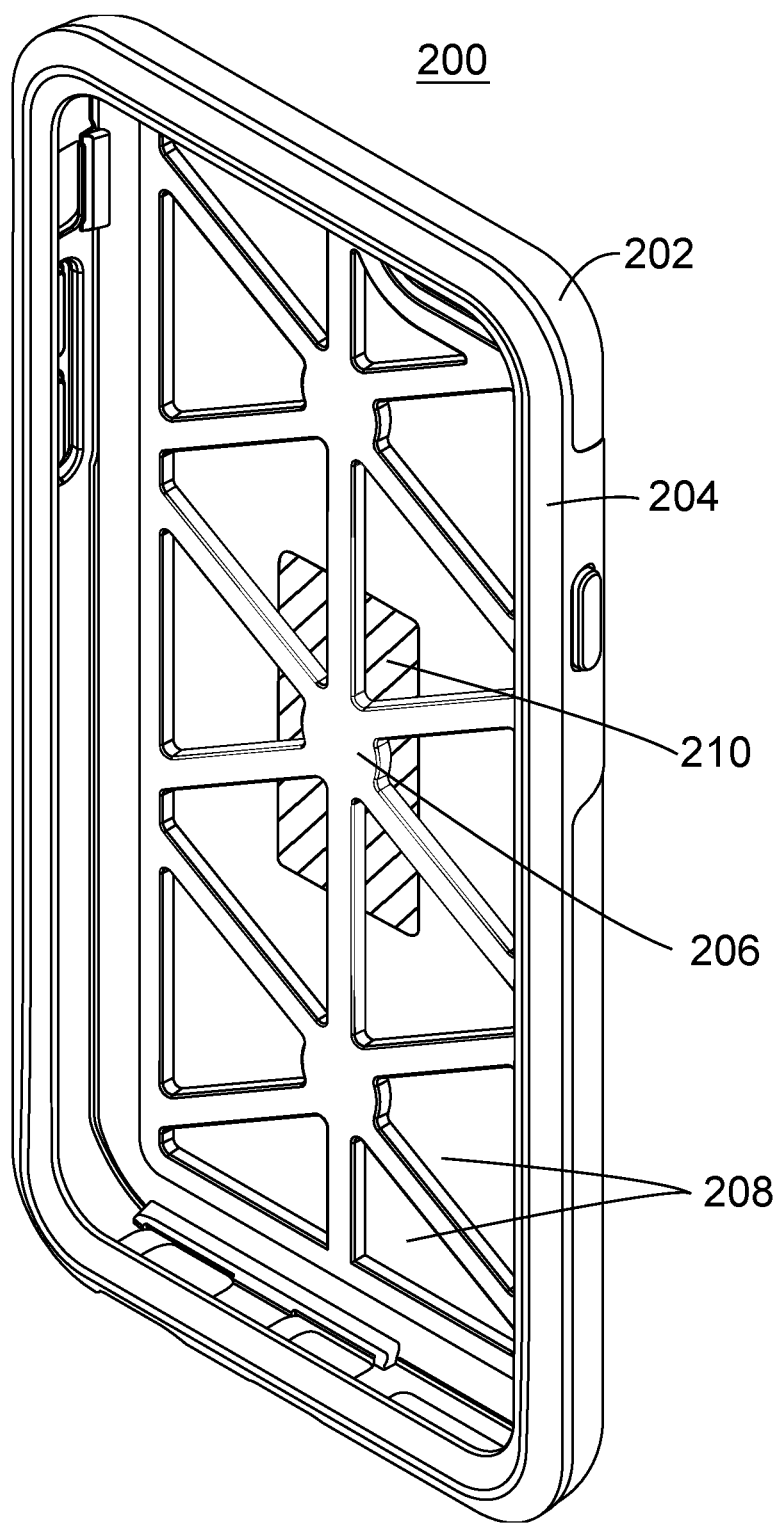
FIG. 2 illustrates a front perspective view of a protective case.

In FIG. 1, ferrite 210 is implemented in part of the rigid shell portion 202 and in part of cushion layer 206. FIG. 2 illustrates protective case 200 with ferrite 210 implemented in the rigid shell portion 202, without also being implemented in cushion layer 206.

Figure 3:
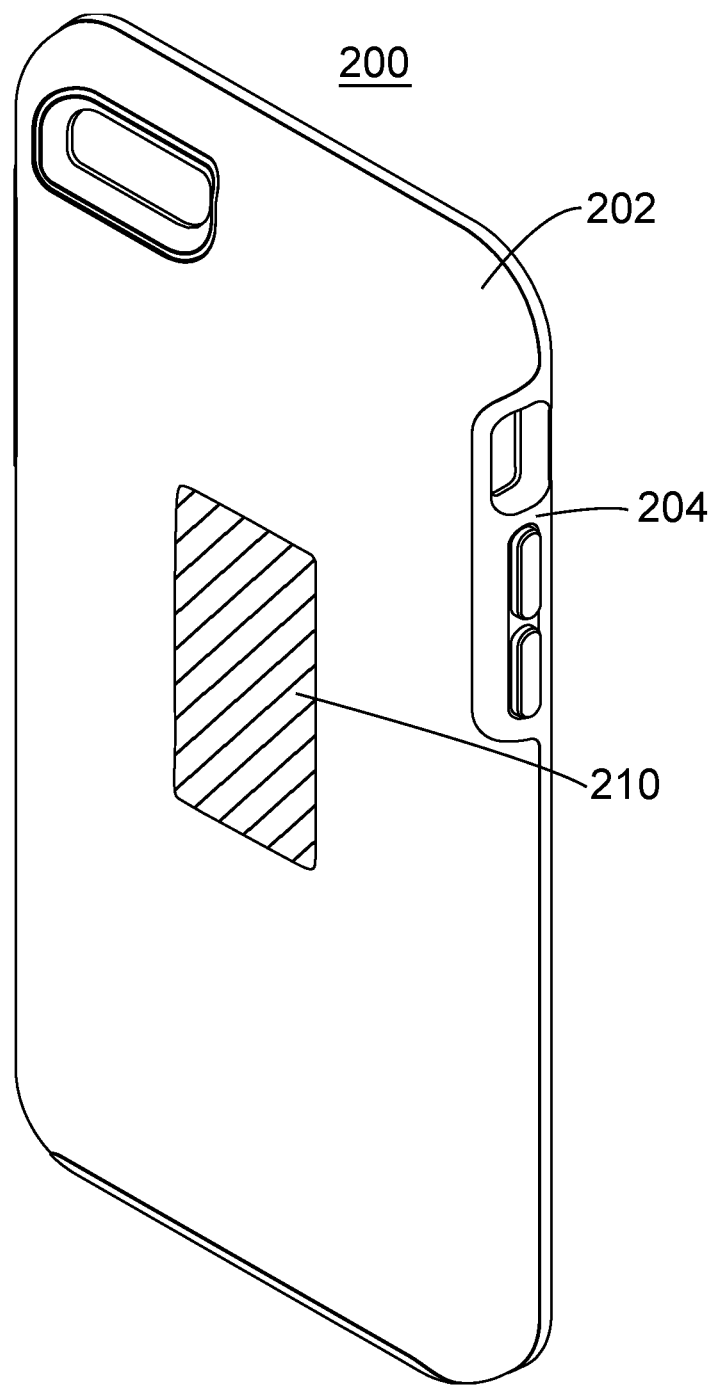
FIG. 3 illustrates a rear perspective view of a protective case.

FIG. 3 illustrates a rear perspective view of protective case 200 where ferrite 210 is located on the back of protective case 200. Ferrite 210 may be affixed to, adhered to, attached to, and/or embedded in any portion of protective case 200. In some situations, ferrite 210, or another material having high magnetic permeability relative other components of protective case 200, may be molded into, molded with, or molded inside of one of the components of protective case 200 such that it is not externally visible on protective case 200.

In some examples, ferrite 210 may be a component that is attached to protective case 200. In other examples, ferrite 210 may be formed at least by co-molding a high magnetic permeability material to, with, or into a material of one or more of the shell components. In some examples, the high magnetic permeability material may include a powdered or granular material, such as ferrite, that may be mixed with material that is used to form one or more portions of the shell such that color and texture of those portion(s) may be consistent with or complementary to the remainder of protective case 200. In some instances, ferrite 210 of the protective case 200 may be formed in a pattern, such as to form an icon or text visible to a user. In some configurations, ferrite 210 may include high magnetic permeability material that does not mix well with a material of the case. In this instance, the high magnetic permeability material may be mixed with another material that co-molds well with other materials of protective case 200. In some configurations, protective case 200 may include two or more layers of high magnetic permeability materials.

One skilled in the art will recognize that the illustrated implementations in FIGS. 1 and 2 may be reversed with respect to rigid and compliant shell portions 202 and 204. A ferrite material 210, or other material having a high magnetic permeability, may be included in the material of one or more shell portions regardless of the order of the shell materials. For example, an embodiment not illustrated may include protective shell having an inner rigid shell that is at least partially surrounded by an outer compliant shell portion, with or without a cushion layer. Corners of the protective shell may include compliant portions. Herein, the term "compliant", when referring to shell material, is to be interpreted as referring to the comparative rigidity of the material with respect to the term "rigid". A compliant shell material may be formed from one or more substances having a shore A hardness less than about 50. In some protective cases, a compliant shell portion may have a shore A hardness in the range of about 15 to 30, about 10 to 35 or about 10 to 45.

Figure 4A:
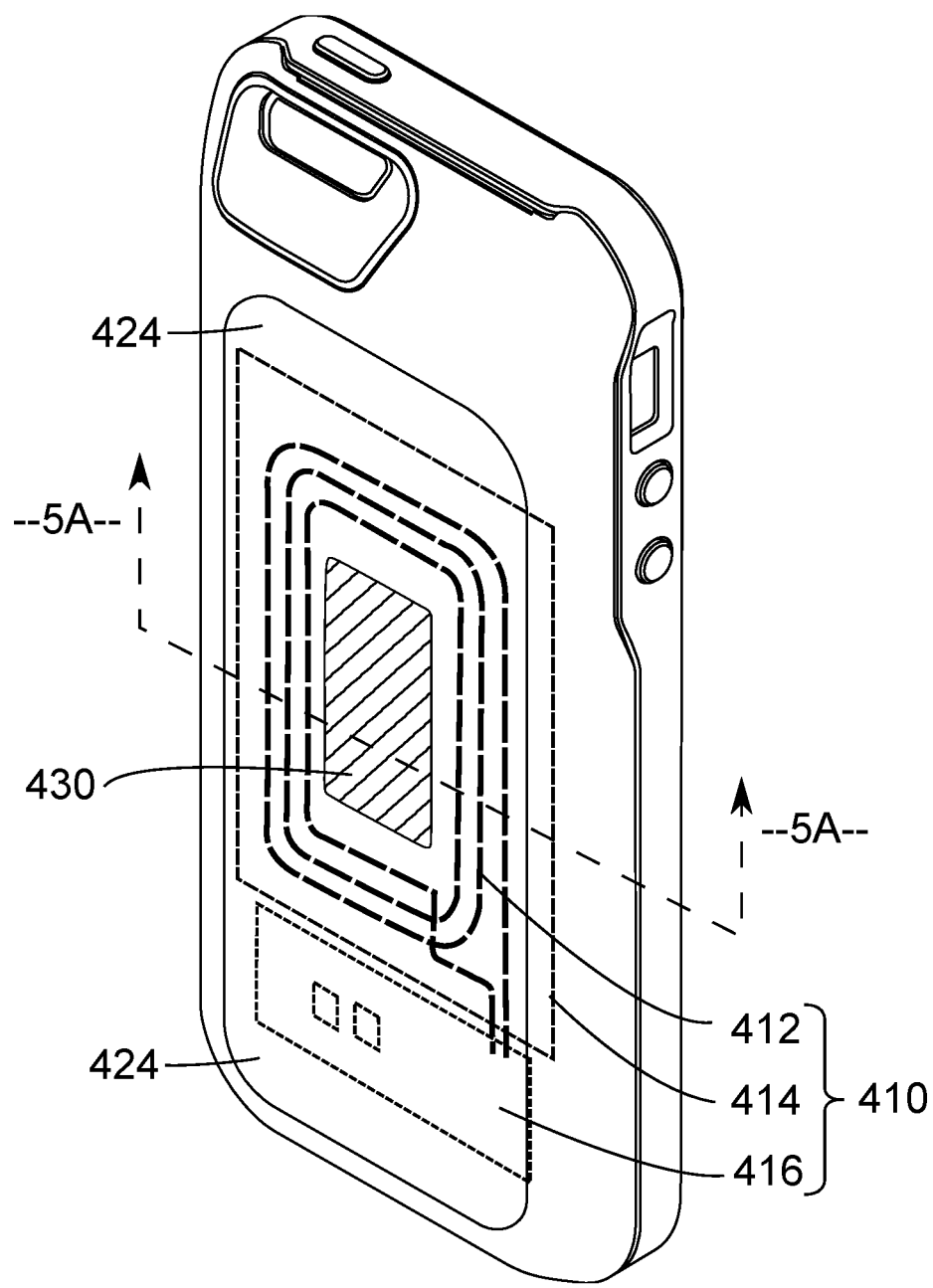
FIGS. 4A and 4B illustrates rear perspective views of protective cases having wireless charging circuitry.
Figure 4B:
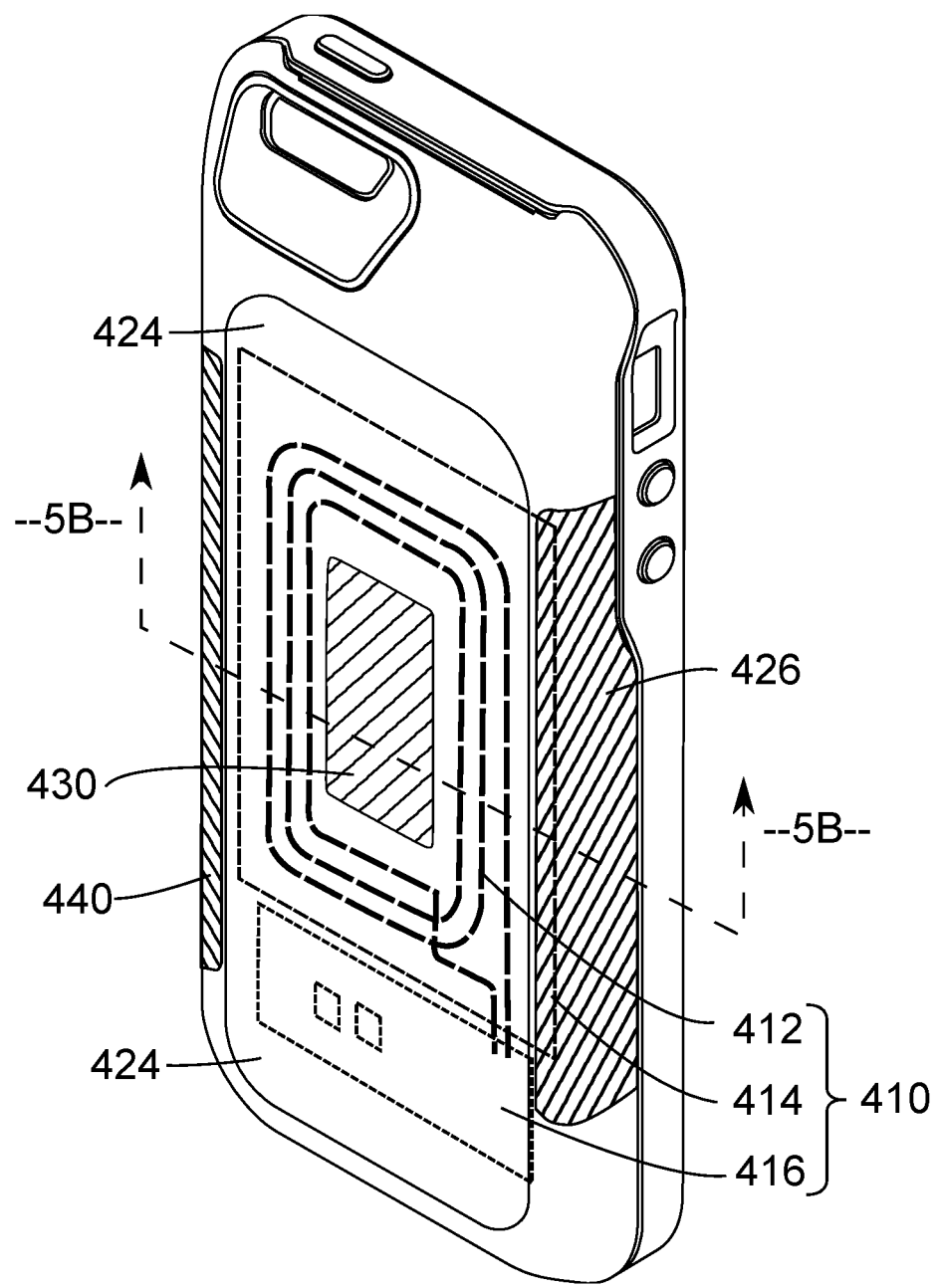

FIGS. 4A and 4B illustrate rear perspective views of a protective case 400 having wireless charging circuit 410. Protective case 400 is an example of protective case 200 and may include any of the features, functions, elements, and/or characteristics of protective case 200. Protective case 400 includes a wireless charging circuit 410 that may be similar to wireless charging circuit 110 of electronic device 100. Wireless charging circuit 410 includes a wireless charging receiving coil 412 having a ferrite backing 414 (or other high magnetic permeability material), and a printed circuit board 416 all disposed in a cavity 420 of the protective case 400. A rear wall 424 of the cavity 420 may also include a ferrite 430, similar to the ferrite 210 that is co-molded with, or otherwise formed in, attached to, affixed to, or embedded in rear wall 424. In some embodiments (not shown), ferrite backing 414 may be co-molded with, or otherwise formed in an inner wall 422 of cavity 420.

FIG. 4A illustrates protective case 400 having a wireless charging circuit 410 where a ferrite 430 is included only in a central location. FIG. 4B illustrates protective case 400 of FIG. 4A with the addition of high magnetic permeability case portions 440 at a periphery of rear wall 424. The high magnetic permeability material may extend only to the periphery of rear wall 424 or may extend even further into one or more portions of side walls 426 of protective case 400.

Protective case 400 provides or improves wireless charging capabilities for an electronic device installed in protective case 400. In one variation, the installed electronic device does not include wireless charging capability but protective case 400 provides wireless charging capability when the electronic device is installed in protective case 400. In this variation, electrical power wirelessly received by protective case 400 using wireless charging circuitry 410 is transferred to the installed electronic device through one or more wired electrical connections (not pictured) established between protective case 400 and the installed electronic device. The electrical connections may include electrical cables, electrical conductors, and/or electrical plugs or connectors.

In another example, an electronic device installed in protective case 400 may have wireless charging capability but the wireless charging capability may be impaired by the addition of protective case 400. Therefore, power may be transferred to wireless circuitry 410 of protective case 400 in lieu of wirelessly transferring the power directly to the installed electronic device from the charging source. Once the power is received at protective case 400, it may be transferred to the electronic device through a hard connection, as discussed in the previous example. Alternatively, it may be transferred from protective case 400 to the installed electronic device wirelessly using one or more of the wireless power transfer techniques discussed herein. Wirelessly transferring the power from protective case 400 to the installed electronic device may be performed using wireless circuitry 410 or may be performed using another set or wireless circuitry and/or another coil in protective case 400. In other words, even if the installed electronic device may have wireless power reception capabilities, an external wireless charging source may wirelessly provide the power to protective case 400 as an intermediary before some or all of that power is wirelessly transferred to the installed electronic device. In some instances, protective case 400 may utilize some or all of the received power before a remaining portion of the received power is transferred to the installed electronic device.

Intermediary transfer of the power to protective case 400 may be necessary for one or more of a variety of reasons. In one example, there may be a desire to use some of the power to power electrical components in protective case 400. In another example, there may be a desire to use some of the power to charge a battery or other power storage device of protective case 400. In another example, it may be difficult or impossible to charge the installed electronic device directly when it is installed in protective case 400 due to the additional separation between the electronic device and the charging device caused by protective case 400 and/or interference caused by protective case 400. In yet another example, protective case 400 may be capable of wirelessly receiving power according to one wireless transfer protocol or standard and wirelessly providing some or all of that power to the installed electronic device according to a different wireless transfer protocol or standard thereby adapting the electronic device to be charged from a charging source with which the electronic device is not inherently compatible. In other words, protective case may serve to translate from one wireless charging protocol to another.

Figure 5A:
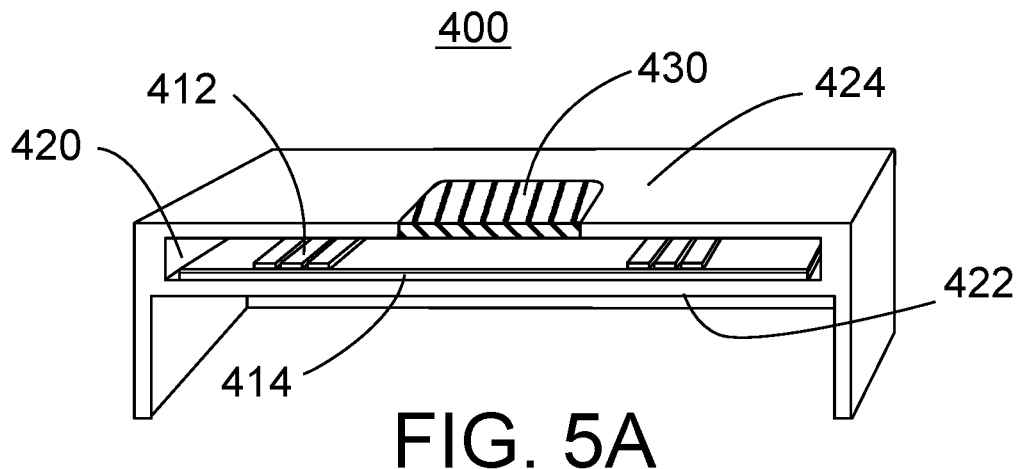
FIGS. 5A and 5B illustrate cross-sectional views of protective case having wireless charging circuitry.
Figure 5B:
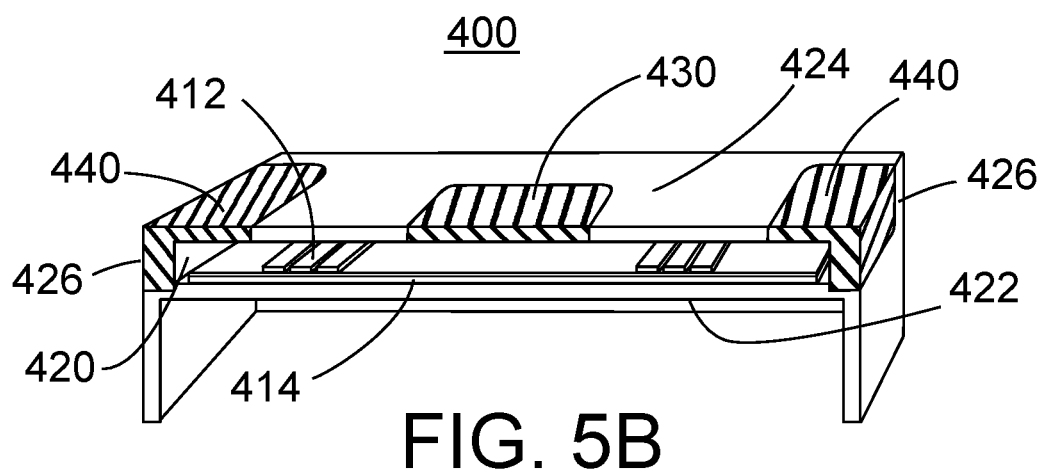

FIG. 5A illustrates a cross-sectional view of protective case 400 of FIG. 4A. As illustrated in FIG. 5A some or all of the wireless charging components of protective case 400 may be included in a cavity 420 of protective case 400. Similarly, FIG. 5B illustrates a cross-sectional view of protective case 400 of FIG. 4B. The device in FIG. 5B includes high permeability material extending into the back portion 440 and side portion 426 of protective case 400.

Figure 6:
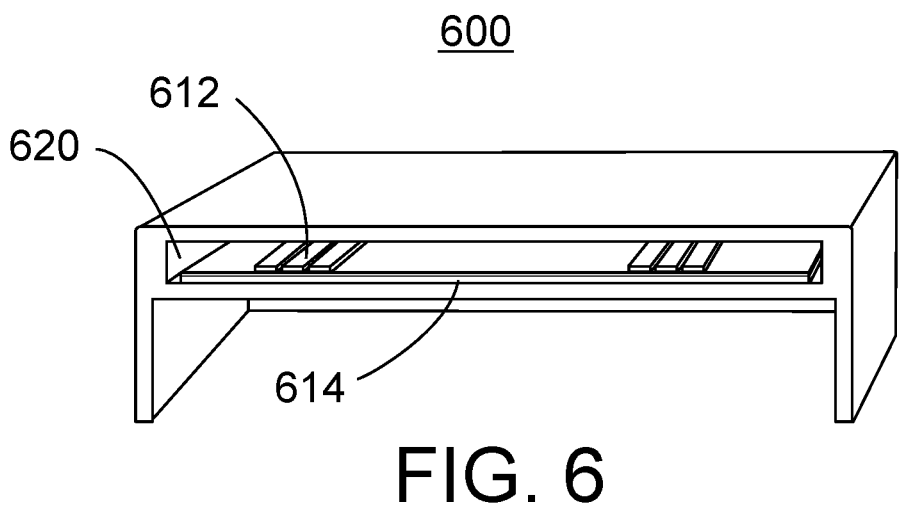
FIG. 6 illustrates a cross sectional view of a protective case having a coil.

FIG. 6 illustrates a cross-section of a protective case 600. Protective case 600 may include any of the features, functions, elements, and/or characteristics of protective case 200 and/or protective case 400. Protective case 600 includes a cavity 620 that contains a wireless charging coil 612 with ferrite backing 614. However, protective case 600 does not include a high permeability core or region, such as ferrite 430 or ferrite 210, in or near the center of wireless charging coil 612. In some situations, the high permeability core or region may not be necessary because wireless charging coil 612 of protective case may be sufficiently close to the surface of protective case 600 to properly interact with a charging source coil and no effort is being made to transfer power directly from the charging source coil to an electronic device installed in protective case 600.

In other embodiments, any of the protective cases described herein may include one or more power storage elements, such as a rechargeable battery, that may be charged wirelessly from an external charging source using any of the wireless charging circuitry or components described herein. Such protective case may include a cavity that includes the power storage element(s), charging circuitry for charging the power storage element(s), and/or elements for conducting power stored in the power storage element(s) to an encased or installed device. This type of protective case may be referred to as a 'battery case' in some instances and such battery cases may also have wireless charging circuitry that includes an inductive antenna/coil, a backing including a high magnetic permeability material, a PCB, and/or other circuitry for processing or utilizing an electric current induced in the antenna/coil. The PCB and/or other circuitry may be combined with the charging circuitry of the protective case in some implementations. The protective case may also include a ferrite core, or other high magnetic permeability material insert, core, material, or region co-molded or otherwise formed in a back wall of the protective case to enhance magnetic coupling of the wireless charging circuitry.

In some embodiments of a battery case, additional circuitry may be included to enable the power storage element to discharge current into the inductive antenna/coil for wirelessly charging an external device (a device external to the case and the installed electronic device). For example, the case may be used, with or without an installed electronic device, as a wireless power transmitter to wirelessly charge a music player, phone, or other device that includes wireless charging capabilities but is not installed in the protective case. The central ferrite, or other high magnetic permeability material, and/or side portion ferrites may also enhance magnetic coupling with such external device by increasing the magnetic coupling factor, concentrating the magnetic flux, and/or constraining or steering the magnetic field.

It will be recognized that any of the of the high magnetic permeability features added to a protective case as described herein may also be positioned, oriented, configured, and/or adapted to enhance any wireless communication functions of an installed electronic device that rely on magnetic inductance. This may include wireless communications other than wireless power transfer. For example, nearfield communications (NFC), radio frequency identification (RFID), and the like may use magnetic waves for power or communication transfer, and may thus benefit in certain implementations by including one or more of the features described herein and/or using one or more of the techniques disclosed herein.

Also disclosed are methods of manufacturing the types of cases described herein. One exemplary method includes molding a shell from a first material. The shell is configured for receiving and at least partially covering the electronic device. The shell has a back portion and side portions extending from the back portion. The back portion of the shell is configured to be adjacent to the back surface of the electronic device when the electronic device is installed in the protective case. The method further includes embedding a core comprising a high magnetic permeability material in the back portion of the shell, the high magnetic permeability material being different than the first material. The core is positioned in the back portion of the shell at a location on the back portion that coincides with a center region of the wireless charging coil of the wireless charging circuitry of the installed electronic device. The core increases magnetic coupling between the wireless charging coil of the installed electronic device and an external coil.

In one variation, a method for manufacturing a case includes preparing a first molding material and preparing a second molding material comprising the first molding material and a material having a high magnetic permeability relative to the first molding material. The method further includes molding a shell from the first molding material and the second molding material. The embedding of the core may occur during the molding of the shell. The molding process may include injection molding the first material to form a majority of the shell and injection molding the second material in an area where a coupling region is desired. In other situations, the high magnetic permeability material may be added to the case after one or more other portions of the case have already been molded.

In the previously described method, the shell is adapted for receiving and at least partially covering the electronic device. The shell has a back portion and side portions extending from the back portion such that the back portion of the shell is adapted to be adjacent to the back surface of the electronic device when the electronic device is installed in the cover. A substantial portion of the shell is molded from the first molding material and the coupling region of the shell includes the second molding material. The coupling region is located on the back portion of the shell and aligns with a center region of the wireless charging coil of the wireless charging circuitry of the installed electronic device. In other words, the shell is formed from two materials such that the material having a high magnetic permeability is concentrated in the desired coupling region. The two materials may be of a same color and molded such that the case has a uniform color and/or appearance and it is not visibly evident that there is a concentration of the second material in or concentrated in one area of the case. The coupling region increases magnetic coupling between the wireless charging coil of the installed electronic device and a source charging coil when the cover with the installed electronic device is placed in proximity to the source charging coil.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "on other examples," "in some cases," "in some situations," "in one configuration," "in other situations," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective case for an electronic device, the electronic device having a housing and wireless charging circuitry and a wireless charging coil inside the housing proximate a back surface of the electronic device, the protective case comprising:
   a shell for receiving and at least partially covering the electronic device, the shell comprising a first material and having a back portion and side portions extending from the back portion, the back portion of the shell configured to be adjacent to the back surface of the electronic device when the electronic device is installed in the protective case; and
   a core comprising a second material that has a magnetic permeability substantially greater than a magnetic permeability of the first material, the core affixed to the back portion of the shell at a location on the back portion that coincides with a center region of the wireless charging coil of the wireless charging circuitry of the installed electronic device, the core to increase magnetic inductive coupling between the wireless charging coil of the installed electronic device and a source charging coil when the protective case with the installed electronic device is placed in proximity to the source charging coil.

2. The protective case of claim 1 wherein the shell comprises an outer structural layer and an inner cushion layer and wherein the inner cushion layer is adjacent to at least a portion of the back surface of the installed electronic device.

3. The protective case of claim 1 wherein the core is molded into the back portion of the shell.

4. The protective case of claim 1 wherein the core is attached to an inner surface of the back portion of the shell or is attached to an outer surface of the back portion of the shell.

5. The protective case of claim 1 wherein the core is embedded in an inner surface of the back portion of the shell or is embedded in an outer surface of the back portion of the shell.

6. The protective case of claim 1 wherein the second material comprises ferrite.

7. The protective case of claim 1 wherein the core extends to a periphery of the back portion of the shell.

8. The protective case of claim 7 wherein the core further extends from the periphery of the back portion of the shell into at least one of the side portions of the shell.

9. The protective case of claim 1 wherein the shell comprises two or more shell members.

10. The protective case of claim 1 wherein the electronic device is a smartphone and the source charging coil is associated with a wireless charging power source for wirelessly charging the smartphone.

11. The protective case of claim 1, wherein the core has a primary plane that is substantially parallel to a primary plane of the wireless charging coil of the installed electronic device, the core being positioned between source charging coil and the wireless charging coil of the electronic device when the protective case with the installed electronic device is placed in proximity to the source charging coil.

12. The protective case of claim 1, wherein at least part of the core is positioned on an interior surface of the protective case configured to be adjacent to at least a portion of the back surface of the electronic device when the electronic device is installed in the protective case.

13. A cover for an electronic device having a housing and wireless charging circuitry, the wireless charging circuitry including a wireless charging coil positioned inside the housing and proximate and substantially parallel with a back surface of the electronic device, the cover comprising:
a back portion configured to be adjacent to the back surface of the electronic device when the electronic device is installed in the cover, the back portion comprising a first material;
side portions extending from the back portion, the side portions for retaining the installed electronic device against the back portion of the cover, the back portion and the side portions at least partially covering the installed electronic device; and
a coupling region in the back portion of the cover, the coupling region comprising a high magnetic permeability material that is different than the material of the back portion of the cover, the coupling region located on the back portion of the cover to align with a center region of the wireless charging coil of the wireless charging circuitry of the installed electronic device and adapted to increase magnetic coupling between the wireless charging coil of the installed electronic device and an external coil.

14. The cover of claim 13 wherein the coupling region comprises a ferrite core attached to the back portion of the cover.

15. The cover of claim 13 wherein the high magnetic permeability material is molded into the first material of the back portion to form the coupling region.

16. The cover of claim 15 wherein the high magnetic permeability material is combined with the first material in the coupling region during a molding process.

17. The cover of claim 13 further comprising:
a power storage device disposed in a cavity of the back portion; and
electrical circuitry for transferring electrical power from the power storage device to the installed electronic device.

18. The cover of claim 17 wherein the electrical circuitry includes a coil for wirelessly transferring the electrical power from the power storage device to the installed electronic device.

19. A method of manufacturing a protective case for an electronic device having a housing, wireless charging circuitry, and a wireless charging coil positioned in the housing proximate a back surface of the electronic device, the method comprising:
molding a shell from a first material, the shell configured for receiving and at least partially covering the electronic device, the shell having a back portion and side portions extending from the back portion, the back portion of the shell configured to be adjacent to the back surface of the electronic device when the electronic device is installed in the protective case; and
embedding a core comprising a high magnetic permeability material in the back portion of the shell, the high magnetic permeability material being different than the first material, the core positioned in the back portion of the shell at a location on the back portion that coincides with a center region of the wireless charging coil of the wireless charging circuitry of the installed electronic device, the core to increase magnetic coupling between the wireless charging coil of the installed electronic device and an external coil.

20. The method of claim 19 wherein the embedding of the core occurs during the molding of the shell.

21. The method of claim 19 wherein the high magnetic permeability material comprises ferrite.

\* \* \* \* \*